(12) United States Patent
Maeda et al.

(10) Patent No.: US 6,231,987 B1
(45) Date of Patent: May 15, 2001

(54) GLASS COLORANT COMPOSITION

(75) Inventors: Yoshifumi Maeda, Hyogo; Kazuo Goto, Osaka, both of (JP)

(73) Assignee: Mitsuboshi Belting Ltd., Hyogo (JP)

( * ) Notice: Subject to any disclaimer, the term of this patent is extended or adjusted under 35 U.S.C. 154(b) by 0 days.

(21) Appl. No.: 09/172,156

(22) Filed: Oct. 14, 1998

(30) Foreign Application Priority Data

Oct. 14, 1997 (JP) .................................................... 9-297812

(51) Int. Cl.[7] ........................................................ B32B 17/06
(52) U.S. Cl. ........................ 428/434; 106/31.9; 252/304; 428/546
(58) Field of Search ................................ 428/426, 546, 428/433, 434; 252/304; 106/31.9, 311

(56) References Cited

U.S. PATENT DOCUMENTS

| | | | |
|---|---|---|---|
| 4,170,460 | * 10/1979 | Donley | 65/30.13 |
| 5,254,191 | * 10/1993 | Milkesha et al. | 156/89 |
| 5,731,075 | 3/1998 | Goto et al. | 156/89 |

* cited by examiner

*Primary Examiner*—Francis J. Lorin
(74) *Attorney, Agent, or Firm*—Wood, Phillips, VanSanten, Clark & Mortimer

(57) ABSTRACT

A composition for transparent coloration of a glass surface. The composition has fine gold (Au) particles; fine silver (Ag) particles; a fixing agent including an organic Ti compound, an organic Fe compound, and an organic Si compound; a binder resin; and an organic solvent. The relationship between the amount of gold and silver particles to the fixing agent as a ratio of the number of metal atoms is as follows: $(Au+Ag)/(Ti+Fe+Si) < \frac{1}{2}$.

26 Claims, 1 Drawing Sheet

GLASS COLORANT COMPOSITION

FIELD OF THE INVENTION

This invention relates to colorant compositions and, more particularly, to a colorant composition that is particularly suitable to being used on a glass surface.

BACKGROUND ART

It is known to color a surface of a glass substrate by coating a mixture of a glass powder and a colorant on the surface of the glass and then baking the mixture. This method has the advantage that the colorant can be readily coated upon the glass surface, facilitating design using the colorant. However, light may be scattered at a molten boundary of the glass powder so that parallel transmittance of light may be reduced to 80% or less.

To overcome the above problem, different methods have been devised. One of these methods is referred to as an ion exchange method. With this method, an inorganic salt containing Ag or Cu is coated upon the glass surface and then baked. Oxides deposited on the surface of the glass are removed. Generally, this method has the drawback that there may be poor selection capability since the ultrafine particles may not be easy to form for all elements.

It is also known to apply a dyed polymeric film on the glass surface. This method facilitates multiple tone selection and pattern formation. However, the resulting film may not have the desired durability.

It is also known to prepare a metal film paper that is deposited on a glass surface by a sputtering process. The desired film strength may not be realized using the sputtering process. Further, tone and pattern formation may be restricted. Additionally, the apparatus conventionally used to perform the sputtering process are often large. Still further, this type of apparatus may not be suitable for high volume mass production.

It is also known to form a metal oxide film on a glass substrate by baking an organic metal compound in atmospheric air. It may be difficult to form a pattern using this method.

It is also known to color a starting material for the glass. This method may also have the drawback that it is difficult to form a pattern.

In glass coloration, design properties are important. Facilitated tone and pattern formation is one important goal of those involved in the glass coloration field. Recent studies have reported glass colorants capable of producing various tones by fixing a gold colloid with a metal oxide. Pattern formation is carried out using screen printing. This overcomes a number of the problems in the prior art methods and is said to allow production of glass with excellent design characteristics.

However, since coloration is carried out by plasmon resonance absorption of gold colloids, yellow colors may not be developed effectively. Further, the desired variation in tone may not be possible. More particularly, when only gold is used for fine particles in the colorant, while transparent tones such as blue, purple, pink, grey, and green can be produced, the green may be heavily tinted with blue. Grey may also be tinted blue. It is possible that only a strongly reddish tone may be obtainable. A yellow color cannot be formed. Only the tone of a half mirror-like type metallic gloss can be provided for the reflection color, with the chemical resistance being potentially insufficient.

SUMMARY OF THE INVENTION

The invention is directed to a composition for transparent coloration of a glass surface. The composition has fine gold (Au) particles; fine silver (Ag) particles; a fixing agent including an organic Ti compound, an organic Fe compound, and an organic Si compound; a binder resin; and an organic solvent. The relationship between the amount of gold and silver particles to the titanium, iron, and silicon atoms of the fixing agent as a ratio of the number of metal atoms is as follows: $(Au+Ag)/(Ti+Fe+Si)<½$.

The relationship between the amount of gold and silver particles to the titanium, iron, and silicon atoms of the fixing agent as a ratio of the number of metal atoms may be as follows: $(Au+Ag)/(Ti+Fe+Si)<¼$.

One objective of the present invention is to provide a composition for transparent coloration of glass that lends itself to pattern formation, with clarity and extended, selectable variation of tones.

The inventive structure likewise lends itself to the formation of blue, purple, pink, yellow, green, grey, orange, and like transmission tones through the use of the fine gold and fine silver particles. The half mirror state in the reflection color can be avoided by controlling the density of the fine gold particles and fine silver particles so as to lower the reflecting qualities of the finished colored film, which may be baked on in its final form.

By using a fixing agent with the three organic compounds described, durability, such as resistance to alkali, water resistance, acid resistance, and abrasion resistance, may be improved. The reflection tone may also be varied for orange, yellow, green, blue, purple, white, and the like, depending on the amount of fixing agent that is blended into the composition.

The gold and silver particles may have a diameter of 1 to 100 nm, and more preferably, 1 to 50 nm.

The gold and silver particles may have a diameter of no more than 10 nm and may be dispersed in a first solvent before being combined with the organic solvent.

The first solvent may be at least one of α-terepineol and toluene.

The first gold and silver particles may be dispersed in a polymer.

The polymer may be at least one of nylon 6, nylon 66, nylon 11, nylon 12, nylon 69, polyethylene terephthalate (PET), polyvinyl alcohol, polyphenylene sulfide (PPS), polystyrene (PS), polycarbonate and polymethyl methacrylate having a molecular coagulation energy of at least 2000 cal/mol.

The polymer may be at least one of a crystalline polymer and an amorphous polymer.

The fine gold particles may be dispersed in a polymer in a thermodynamically non-equilibrium state by at least one of a) vacuum vapor deposition by heating a polymer in vacuum, melting and evaporating the polymer, and solidifying the polymer on a substrate to define a polymer layer, and b) melting/quenching solidification by melting the polymer at a temperature higher than a melting temperature for the polymer, placing the melted polymer at the higher temperature into at least one of liquid nitrogen and another cooling medium to effect quenching, and depositing the polymer on a substrate to define a polymer layer.

In one form, the composition has a gold layer laminated to the polymer layer by one of a) vapor depositing the gold layer to the polymer layer and b) adhering the gold layer in the form of a gold foil to the polymer layer and thereafter heating the gold layer and polymer layer to a temperature higher than the glass transition point and lower than the melting point of the polymer to effect stabilization.

The organic solvent may be at least one of methacresol, dimethyl formamide, cyclohexane, and formic acid.

The organic Ti compound may be at least one of a) an alkoxide, b) an alkoxide comprising at least one of ethoxide and propoxide, c) acetyl acetonate, d) organic acid salt, e) a complex Ti salt, f) Ti-propoxide, g) Ti-acetyl acetonate, and h) Ti stearate.

The organic Fe compound may be at least one of a) an alkoxide, b) an alkoxide that comprises at least one of ethoxide and propoxide, c) acetyl acetonate, d) an organic acid salt, e) a complex Fe salt, f) Fe-propoxide, g) Fe-acetyl acetonate, h) Fe-ethoxide, i) Fe-acetate, j) Fe-propionate, k) Fe-naphthenate, and 1) Fe-citrate.

The organic Si compound may be at least one of a) an alkoxide, b) an alkoxide that comprises at least one of ethoxide and propoxide, c) acetyl acetonate of Si, d) organopolysiloxane, e) Si propoxide, f) Si acetyl acetonate, and g) polydimethyl siloxane.

The fixing agent may be present in relation to the number of metal atoms as follows: 10/90 to 95/5 for Ti/Fe and 1/99 to 95/5 for (Ti+Fe)/Si.

The binder resin may be at least one of a) cellulose and b) cellulose comprising at least one of i) nitrocellulose, ii) ethyl cellulose, iii) acetyl cellulose, and iv) butyl cellulose.

The organic solvent may be at least one of a) methacresol, b) carbitol, c) dimethyl formamide, d) dimethyl imidazolidinone, c) terepinol, d) diacetone alcohol, e) ethylene glycol monoethyl ether, and f) ethylene glycol monobutyl ether.

The fine gold and silver particles and fixing agent may be dispersed in the organic solvent and stirred to produce a paste which can be applied by one of (a) spraying, (b) dipping, (c) roll coating, (d) spin coating, (e) flexographic printing, (f) gravure printing, and (g) screen printing.

The invention is also directed to a composition for transparent coloration of a glass surface, which composition has: fine gold (Au) particles; an organic silver (Ag) compound; a fixing agent including an organic Ti compound, an organic Fe compound, and an organic Si compound; a binder resin; and an organic solvent. The relationship between the amount of fine gold particles and organic silver compound to the fixing agent as a ratio of the number of metal atoms is as follows:

(Au+Ag)/(Ti+Fe+Si)<½.

The organic silver compound may be at least one of a) Ag acetate, b) Ag cyanate, and c) Ag thiocyanate.

The invention is also directed to a transparent element having a glass layer with a surface and a composition as recited above applied to the surface of the glass layer.

The composition may be applied to the glass layer surface by one of spraying, dipping, roll coating, spin coating, flexographic printing, gravure printing, and screen printing.

DETAILED DESCRIPTION OF THE PREFERRED EMBODIMENTS

Figure 1:
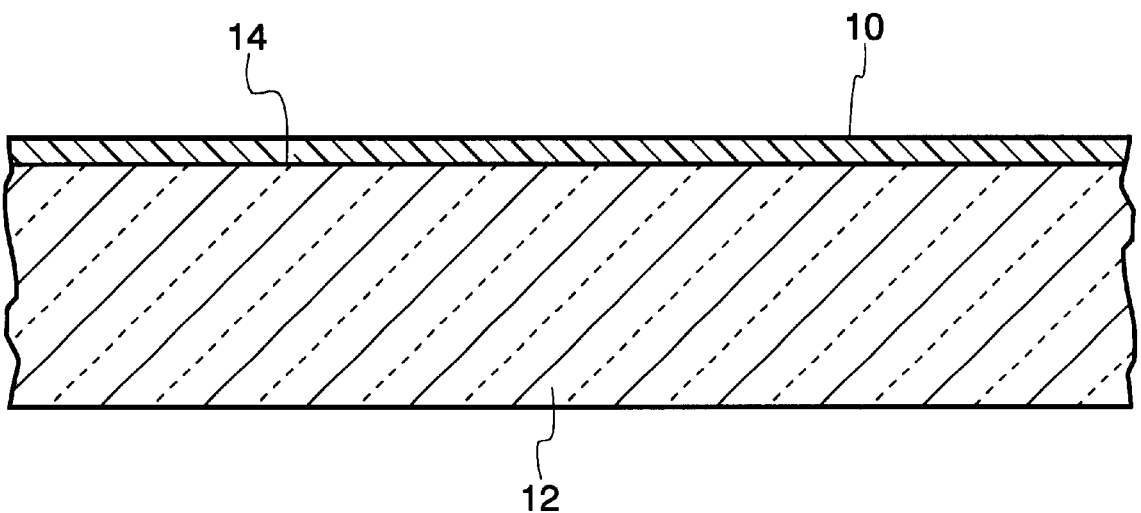
FIG. 1 is a cross-sectional view of a section of a glass layer substrate with a composition for transparent coloration of the glass layer substrate, according to the invention, applied to a surface thereof.

In one form of the invention, fine gold and silver particles are used to form a composition for transparent coloration of a glass surface. The fine gold or silver particles, having a particle diameter from 1 to 100 nm, and more preferably from 1 to 50 nm, may be dispersed without coagulation in a polymer to produce a composite product. Alternatively, fine gold or silver particles having a particle diameter from 1 to 100 nm, and more preferably, 10 nm or less, may be independently dispersed in a solvent such as α-terepineol or toluene.

In forming the composite product by disbursing ultrafine gold particles in the polymer, a polymer layer is formed in a thermodynamically non-equilibrium state. This can be done in a number of different ways, such as: (a) using a vacuum vapor deposition method by heating a polymer in vacuum, melting and evaporating the same, and solidifying the polymer layer on a substrate, or (b) using a melting/quenching solidification method wherein a polymer is melted at a temperature higher than the melting temperature and thereafter placing the composition into liquid nitrogen, or the like, for quenching, and depositing the polymer layer on a substrate.

With the vapor deposition method, a polymer layer can be formed on a substrate such as glass by using a conventional vacuum vapor deposition apparatus using a vacuum of $10^{-4}$ to $10^{-6}$ Torr at a vapor deposition rate of 0.1 to 100 $\mu$/min., and preferably, 0.5 to 5 $\mu$/min. In the melting/quenching solidification method, a polymer layer is obtained by melting a polymer and cooling the same at a rate higher than the critical cooling rate inherent to the polymer. The resulting polymer layer is placed in a thermodynamically non-equilibrium, unstable state, with the equilibrium state being reached with the lapse of time.

Preferred polymers are, for example, nylon 6, nylon 66, nylon 11, nylon 12, nylon 69, polyethylene terephthalate (PET), polyvinyl alcohol, polyphenylene sulfide (PPS), polystyrene (PS), polycarbonate, and polymethyl methacrylate having a molecular coagulation energy of 2000 cal/mol or higher. The polymer may also include crystalline polymers and amorphous polymers. The molecular coagulation energy is defined in the Applied Section of Manual of Chemistry, edited by Chemical Society of Japan, p. 890 (issued in 1974).

A gold layer is laminated to the polymer layer in a thermodynamically non-equilibrium state. This may be done by vapor depositing a gold layer on the polymer layer using a vacuum vapor deposition apparatus, or by adhering a gold foil directly to the polymer layer.

To adhere the gold layer and the polymer layer, the product is heated to a temperature higher than the glass transition point and lower than the melting point of the polymer, whereby the polymer layer assumes a stable state. As a result, gold diffuses and penetrates into the polymer layer in the form of ultrafine particles of 100 nm or less and having a maximum particle size distribution in a range of 1 to 50 nm. This state continues until the polymer layer relaxes completely and the gold layer adhered to the polymer layer decreases in thickness and ultimately is eliminated. The ultrafine particles are distributed with no coagulation in the polymer layer. In this form, the content of the ultrafine particles is from 0.01 to 80% by weight. The content can be controlled by varying the manufacturing conditions for the polymer or changing the thickness of the gold layer. However, the manufacturing method for the composite product is not limited to that described above.

The invention also contemplates a method of preparing ultrafine noble metal particles, for example, by (a) a gas phase method/melting and evaporation method, (b) a liquid phase/precipitation method, (c) a solid phase method, (d) a dispersion method, (e) a method carried out by mechanically mixing the ultrafine particles with a polymer made up of a solution or molten liquid, or (f) a method of simultaneously evaporating a polymer and a noble metal and mixing them in a gas phase.

The resulting polymer in which fine gold or silver particles are dispersed is mixed and dissolved in a solvent, which is preferably an organic solvent such as methacresol, dimethyl formamide, cyclohexane and formic acid, to obtain an ultrafine particle dispersion paste in which ultrafine particles are uniformly dispersed. The ultrafine particles, by reason of their small diameter and reaction with the polymer, tend to be retained within the polymer with little settling or coagulation within the paste. In the event that the gold or silver particles are independently dispersed in a solvent before being combined with the organic solvent, described above, a method such as disclosed in Japanese Unexamined Patent Publication No. 3-34211, and referred to as an in-gas evaporation method, may be used. An inert helium gas is introduced to a chamber to evaporate the metal. Cooling and condensing occur by collision with the insert gas. Vapors of an organic solvent, such as α-terepineol are introduced at a stage where particles are in a separated state so that the solvent covers the surface of the particles.

The amount of gold or silver particles is not limited and can be selected depending upon a desired transmittance.

The invention also contemplates that an organic silver compound can be used in place of the silver particles. The silver compound may be, for example, Ag acetate, Ag cyanate and Ag thiocyanate.

The relationship between the amount of fine gold and silver particles, or fine gold particles and an organic silver compound, to the fixing agent made up of Ti, Fe, and Si, as a ratio of the number of metal atoms, is as follows: (Au+Ag)/(Ti+Fe+Si) is less than ½, and more preferably less than ¼. If this ratio exceeds ½, the reflection color of the colored film has a tone with a half mirror-like metallic gloss.

The amount of each of the ingredients in the color composition is determined by the coloration method. For example, in a case of a colorant composition used for screen printing, the atom number concentration of (Au+Ag) is from 0.001 to 0.1 mol %/1 kg. Coloration at sufficient density generally cannot be obtained if the concentration is less than 0.001 mol %/kg. The number of atoms of gold and silver is excessively large in the colorant composition if it exceeds 1 mol %/kg, such that it is not suitable to screen print using the fixing agent of the organic Ti compound, the organic Fe compound, and the organic Si compound, blended as described above.

The fixing agent made up of the organic Ti compound, organic Fe compound, and organic Si compound may have a Ti compound which includes alkoxides such as ethoxide or propoxide, acetyl acetonate, organic acid salts and various kinds of complex salts of Ti (titanium) and, specifically, Ti-propoxide, Ti-acetyl acetonate and Ti stearate.

The organic Ti compound improves the alkali resistance and increases water resistance for the colored film. The organic Ti compound has to be soluble in the organic solvent in the colorant composition. Increasing the amount causes the colored film to become tinted blue.

The organic Fe compound shifts the plasmon resonance absorption peak of the fine gold particles to a longer wave side. The organic Fe compound may include alkoxides, for example, ethoxide or propoxide, acetyl acetonate, organic acid salt or various kinds of complex salts of Fe (iron), and including specifically Fe-propoxide, Fe-acetyl acetonate, Fe-ethoxide, Fe-acetate, Fe-propionate, Fe-naphthenate and Fe-citrate.

The organic Fe compound is soluble in the organic solvent to obtain transparency of the colored film resulting from baking the colorant composition.

The organic Si compound may be an alkoxide, such as ethoxide or propoxide, or acetyl acetonate or Si(silica), or organopolysiloxane and including, specifically, for example, Si propoxide, Si acetyl acetonate and polydimethyl siloxane.

The organic Si compound improves the acid resistance and abrasion resistance of the colored film. The Si compound must be soluble in the organic solvent. Increasing the organic Si compound makes the tone of the colored film reddish.

The fixing agent is added according to the following ratio for the number of metal atoms: 10/90 to 95/5 for Ti/Fe and from 1/99 to 95/1 for (Ti and Fe)/Si.

The binder resin keeps the viscosity of the colorant composition such that it can be handled conveniently to facilitate coating on a glass substrate. The binder resin also maintains the strength of the composition film coated on the substrate. Preferably, the binder resin is decomposed at a low temperature during baking. However, the only necessary restriction is that the resin be soluble in an organic solvent.

Suitable binder resins are as follows: nitrocellulose, ethyl cellulose, acetyl cellulose, and butyl cellulose.

The amount of binder resin added is determined by the printing or coating conditions, with there being no specific restriction. In the case a composite product is used, the polymer may be the same as the binder resin.

The organic solvent used may include those not coagulating the fine gold or silver particles. Suitable solvents are high boiling point solvents such as methacresol, carbitol, dimethyl formamide, dimethyl imidazolidinone, terepinol, diacetone alcohol, ethylene glycol monoethyl ether and ethylene glycol monobutyl ether.

The organic solvent dissolves the binder resin or the polymer in which the binder resin and the fine gold or silver particles are dispersed. One or more of the solvents can be used.

A paste form of the colorant composition can be obtained either by a) dissolving fine metal particles made up of fine gold particles and fine silver particles, a fixing agent including an organic Ti compound, an organic Fe compound, an organic Si compound, and a binder resin dispersed independently in a solvent, into an organic solvent, or b) dissolving fine gold particles, an organic silver compound, a fixing agent including an organic Ti compound, an organic Fe compound, and an organic Si compound, and a binder resin into an organic solvent and then stirring the same.

The paste, shown at 10 in FIG. 1, can be screen printed on a glass substrate 12. In the printing process, the glass substrate is disposed several millimeters below a horizontally spaced screen. The screen may be, for example, a plain weave polyester having a 255 mesh. After placing the colorant composition on the screen, the colorant composition is spread over the screen by using a squeegee. The screen is pressed and moved by the squeegee to bring the screen in contact with the surface 14 of the substrate 12 to be printed. This procedure can be repeated, as necessary.

After leaving the substrate 12 with the composition 10 thereon in an atmosphere at 100 to 200° C. for ten minutes, drying occurs by removing the organic solvent. The composition may be dried while deaerating in a tightly closed vessel. The composition is then baked by heat treatment at 300 to 800° C. for several minutes.

The composition 10 can be applied to the substrate 12 by spraying, dipping, roll coating, spin coating, flexographic printing, or gravure printing, as an alternative to the above-described screen printing.

The present invention will now be described with respect to various examples. The optical characteristics and durability for a colored film using the colorant composition were determined as follows. For the optical characteristics, transmission color and reflectance of the colored films were measured by a color difference meter. Reflection colors were evaluated visually.

As to durability, change of transmission color before and after immersing a colored film in boiling water for four hours (ΔE) was measured by using a color difference meter and calculated based on the equation: $\Delta E=(L^2+a^2+b^2)^{1/2}$.

INVENTIVE EXAMPLES 1–3 AND COMPARATIVE EXAMPLES 1–2

Fine particles, a fixing agent, a binder resin, and an organic solvent, shown in Table 1, below, were blended. The blends were stirred and mixed at 50° C. for sixty minutes to obtain a green tinted colored composition.

TABLE 1

|  | Inventive Examples | | | Comparative Examples | |
|---|---|---|---|---|---|
|  | 1 | 2 | 3 | 1 | 2 |
| Fine particle ingredient | | | | | |
| Fine gold particles | 1.00 | 1.00 | 1.00 | 1.00 | 1.00 |
| Fine silver particles | 0.50 | — | — | — | — |
| Silver cyanate | — | 0.60 | 0.60 | — | — |
| Fixing agent | | | | | — |
| Ti Tetrapropoxide | 12.00 | 12.00 | 10.00 | 2.50 | 2.50 |
| Fe naphthenate | 12.00 | 12.00 | 10.00 | 5.00 | 5.00 |
| Silicone oil | 2.00 | 2.00 | 1.00 | 1.00 | 1.00 |
| Binder resin | | | | | |
| Nitrocellulose | 6.00 | 6.00 | 6.00 | 6.00 | — |
| Nylon 11 | — | — | — | — | 6.00 |
| Organic solvent | | | | | |
| Terepineol | 66.50 | 66.40 | 71.40 | 84.50 | — |
| Methacresol | — | — | — | — | 84.50 |
| Optical Characteristics | | | | | |
| Transmission Tone | | | | | |
| L | 56.00 | 58.02 | 58.02 | 58.23 | 57.52 |
| a | −15.50 | −14.90 | −14.75 | −9.65 | −6.65 |
| b | 0.25 | 2.01 | 0.15 | −1.02 | −0.65 |
| Reflection | | | | | |
| Reflectance (%) | 8.80 | 9.20 | 9.55 | 18.80 | 15.62 |
| Tone (visual) | Yellow green | Yellow green | Blue | Gold | Gold |
| Durability | | | | | |
| Change of tone ΔE | 0.25 | 0.36 | 0.33 | 0.98 | 2.52 |

The color compositions were printed using a screen printing process on a glass substrate that was float glass having a 3 mm thickness, a width of 30 mm, and a length of 40 mm. The compositions were then dried at 150° C. for five minutes. The coated glass was then baked in a furnace at 700° C. for 150 seconds to form transparent colored films from the composition. The composition of the colorant and characteristics of the colored films are shown in Table 1.

The gold and silver particles used in the inventive examples 1–3 and comparative example 1 were formed by pretreating the gold and silver particles with terepineol. The gold particles used in comparative example 2 were prepared as follows.

5 g of a polymer pellet of nylon 11 was placed in a tungsten board and then depressurized to $10^{-6}$ Torr by using a conventional vacuum vapor deposition apparatus. A voltage was applied to heat the tungsten boat in the vacuum and melt the polymer to obtain a polymer layer of a vapor deposition film of approximately 5 μm thickness on a glass substrate on an upper portion of an attaching stand under a vacuum of from $10^{-4}$ to $10^{-6}$ Torr at a rate of approximately 1 μm/min. The molecular weight of the polymer layer was approximately ½–1/10 of the polymer pellet.

A gold chip was heat melted in a tungsten boat and vapor deposited under a vacuum of $10^{-4}$ to $10^{-6}$ Torr to place a gold vapor deposition film on the polymer layer. The polymer layer and film were taken out of the vacuum vapor deposition apparatus and left for ten minutes in a thermostable bath at 120° C. to obtain a composite product. The composite product had approximately 20% by weight gold, with an average particle diameter of 5 nm. The obtained composite product was mixed with methacresol at a 1:1 weight ratio to prepare a solution of the composite product.

Values for transmission tone were −15 point both in inventive example 1 using fine gold and silver particles together and in inventive examples 2 and 3 using fine gold particles and silver cyanate together, which were smaller compared with comparative examples 1 and 2. It can be seen that they exhibited a fine green color. It can also be seen that the reflectance in the inventive examples was smaller compared with the comparative examples and that they were not in the half mirror state. Further, in inventive examples 2 and 3, in which the blending amount of the fixing agent was changed with respect to each other, it can be seen that the reflection color can be varied for yellow, green, and blue. It can further be seen that there was no change of tone for inventive examples 1–3 after being placed in boiling water for four hours, demonstrating excellent durability.

INVENTIVE EXAMPLES 4–9

To change transmission color, additive compositions made up of the fine particles, fixing agent, binder resin, and organic solvent, as shown in Table 2, below, were blended to obtain green, tinted colorant compositions.

TABLE 2

|  | Inventive Example | | | | | |
|---|---|---|---|---|---|---|
|  | 4 | 5 | 6 | 7 | 8 | 9 |
| Fine particle ingredient | | | | | | |
| Fine gold particles | 1.00 | — | 1.00 | 1.00 | 1.00 | 1.00 |
| Fine silver particles | — | 1.00 | — | — | — | — |
| Silver cyanate | 0.10 | 0.10 | 0.10 | 0.50 | 0.50 | 0.10 |
| Fixing Agent | | | | | | |
| Ti tetrapropoxide | 10.00 | 10.00 | 0.50 | 7.50 | 0.50 | 7.50 |
| Fe naphthenate | 10.00 | 10.00 | 0.50 | 7.50 | 0.50 | 7.50 |
| Silicone oil | 1.00 | 1.00 | 10.00 | 5.00 | 10.00 | 5.00 |
| Binder resin | | | | | | |
| Nitrocellulose | 6.00 | 6.00 | 6.00 | 6.00 | 6.00 | 6.00 |
| Nylon 11 | — | — | — | — | — | — |
| Organic solvent | | | | | | |
| Terepineol | 71.90 | 71.90 | 81.90 | 72.50 | 81.50 | 72.90 |
| Optical characteristics | | | | | | |

TABLE 2-continued

|  | Inventive Example | | | | | |
| --- | --- | --- | --- | --- | --- | --- |
|  | 4 | 5 | 6 | 7 | 8 | 9 |
| Transmission Tone | | | | | | |
| L | 51.84 | 82.02 | 50.36 | 50.31 | 51.53 | 57.52 |
| a | −5.69 | −4.61 | 33.99 | −4.22 | 17.40 | 4.45 |
| b | −18.50 | 37.54 | −2.86 | 0.52 | 10.92 | −12.24 |
| Reflection | | | | | | |
| Reflectance (%) | 8.80 | 9.20 | 9.55 | 18.80 | 15.62 | 15.62 |
| Tone (visual) | Blue | Yellow | White | Orange | Orange | Orange |
| Durability | | | | | | |
| Change of tone ΔE | 0.25 | 0.36 | 0.87 | 0.25 | 0.76 | 0.40 |

The resulting compositions were printed using a screen printing process, as described above, on a glass substrate, and then dried at 150° C. for ten minutes. The specimens were baked in a furnace at 700° C. for 150 minutes to produce colored films on the glass substrate.

It can be seen that the inventive blend can produce various changes in the transmission color and various reflection colors not in a half mirror state. The coatings demonstrated excellent durability.

The foregoing disclosure of specific embodiments is intended to be illustrative of the broad concepts comprehended by the invention.

We claim:

1. A composition for transparent coloration of a glass surface, said composition comprising:

fine gold (Au) particles;

fine silver (Ag) particles;

a fixing agent comprising an organic titanium (Ti) compound, an organic iron (Fe) compound, and an organic silicon (Si) compound;

a binder resin; and an organic solvent, wherein the relationship between the amount of the fine gold and silver particles to the titanium, iron, and silicon atoms of the fixing agent as a ratio is as follows:

$(Au+Ag)/(Ti+Fe+Si) < 1/2$.

2. The composition according to claim 1 wherein the fine gold particles and fine silver particles have a diameter of 1–100 nm.

3. The composition according to claim 1 wherein the fine gold particles and fine silver particles have a diameter of 1–50 nm.

4. The composition according to claim 1 wherein the fine gold and silver particles have a diameter of no greater than 10 nm and are dispersed in a first solvent before being combined with the organic solvent.

5. The composition according to claim 4 wherein the first solvent comprises at least one of α-terepineol and toluene.

6. The composition according to claim 3 wherein the fine gold and silver particles are dispersed in a polymer.

7. The composition according to claim 6 wherein the polymer comprises at least one of nylon 6, nylon 66, nylon 11, nylon 12, nylon 69, polyethylene terephthalate (PET), polyvinyl alcohol, polyphenylene sulfide (PPS), polystyrene (PS), polycarbonate and polymethyl methacrylate having a molecular coagulation energy of at least 2000 cal/mol.

8. The composition according to claim 6 wherein the polymer comprises at least one of a crystalline polymer and an amorphous polymer.

9. The composition according to claim 1 wherein the fine gold particles are dispersed in a polymer in a thermodynamically non-equilibrium state by at least one of a) vacuum vapor deposition by heating a polymer in vacuum, melting and evaporating the polymer, and solidifying the polymer on a substrate to define a polymer layer, and b) melting/quenching solidification by melting the polymer at a temperature higher than a melting temperature for the polymer, placing the melted polymer at the higher temperature into at least one of liquid nitrogen and another cooling medium to effect quenching, and depositing the polymer on a substrate to define a polymer layer.

10. The composition of claim 9 wherein the composition comprises a gold layer laminated to the polymer layer by one of a) vapor depositing the gold layer to the polymer layer and b) adhering the gold layer in the form of a gold foil to the polymer layer and thereafter heating the gold layer and polymer layer to a temperature higher than the glass transition point and lower than the melting point of the polymer to effect stabilization.

11. The composition according to claim 1 wherein the organic solvent comprises at least one of methacresol, dimethyl formamide, cyclohexane, and formic acid.

12. The composition according to claim 1 wherein $(Au+Ag)/(Ti+Fe+Si) < 1/4$.

13. The composition according to claim 1 wherein the organic Ti compound comprises at least one of a) an alkoxide, b) an alkoxide comprising at least one of ethoxide and propoxide, c) acetyl acetonate, d) organic acid salt, e) a complex Ti salt, f) Ti-propoxide, g) Ti-acetyl acetonate, and h) Ti stearate.

14. The composition according to claim 1 wherein the organic Fe compound comprises at least one of a) an alkoxide, b) an alkoxide that comprises at least one of ethoxide and propoxide, c) acetyl acetonate, d) an organic acid salt, e) a complex Fe salt, f) Fe-propoxide, g) Fe-acetyl acetonate, h) Fe-ethoxide, i) Fe-acetate, j) Fe-propionate, k) Fe-naphthenate, and l) Fe-citrate.

15. The composition according to claim 1 wherein the organic Si compound comprises at least one of a) an alkoxide, b) an alkoxide that comprises at least one of ethoxide and propoxide, c) acetyl acetonate of Si, d) organopolysiloxane, e) Si propoxide, f) Si acetyl acetonate, and g) polydimethyl siloxane.

16. The composition according to claim 1 wherein the fixing agent is present in relation to the number of metal atoms as follows: 10/90 to 95/5 for Ti/Fe and 1/99 to 95/5 for (Ti+Fe)/Si.

17. The composition according to claim 1 wherein the binder resin comprises at least one of a) cellulose and b) cellulose comprising at least one of i) nitrocellulose, ii) ethyl cellulose, iii) acetyl cellulose, and iv) butyl cellulose.

18. The composition according to claim 1 wherein the organic solvent comprises at least one of a) methacresol, b) carbitol, c) dimethyl formamide, d) dimethyl imidazolidinone, e) terepinol, d) diacetone alcohol, e) ethylene glycol monoethyl ether, and f) ethylene glycol monobutyl ether.

19. The composition according to claim 1 wherein the fine gold and silver particles and fixing agent are dispersed in the organic solvent and stirred to produce a paste which can be applied by one of a) spraying, b) dipping, c) roll coating, d) spin coating, e) flexographic printing, f) gravure printing, and g) screen printing.

20. A composition for transparent coloration of a glass surface, said composition comprising:

fine gold (Au) particles;

an organic silver (Ag) compound;

a fixing agent comprising an organic Ti compound, an organic Fe compound, and an organic Si compound;

a binder resin; and an organic solvent, wherein the relationship between the amount of fine gold particles and organic silver compound to the fixing agent as a ratio of the number of metal atoms is as follows:

(Au+Ag)/(Ti+Fe+Si)<½.

21. The composition according to claim 20 wherein the organic silver compound comprises at least one of a) Ag acetate, b) Ag cyanate, and c) Ag thiocyanate.

22. A method for providing transparent coloration of a glass surface, said method comprising the steps:

providing a glass surface; and applying a coating composition to said glass surface to provide a transparent coloration of said glass surface, said coating composition comprising: fine gold (Au) particles, fine silver (Ag) particles, a fixing agent comprising an organic titanium (Ti) compound, an organic iron (Fe) compound, an organic silicon (Si) compound, a binder resin, and an organic solvent.

23. The method according to claim 22, wherein the ratio of said fine gold and said silver particles to said titanium, iron, and silicon atoms is as follows: (Au+Ag)/(Ti+Fe+Si) <½.

24. The method according to claim 22, wherein the ratio of said fine gold and said silver particles to said titanium, iron, and silicon atoms is as follows: (Au+Ag)/(Ti+Fe+Si) <¼.

25. The method according to claim 23, wherein the method of applying said coating composition to said glass surface is selected from the group consisting of spraying, dipping, roll coating, spin coating, flexographic printing, gravure printing, and screen printing.

26. The method according to claim 24, wherein the method of applying said coating composition to said glass surface is selected from the group consisting of spraying, dipping, roll coating, spin coating, flexographic printing, gravure printing, and screen printing.

* * * * *